United States Patent [19]
Swift et al.

[11] Patent Number: 5,768,519
[45] Date of Patent: Jun. 16, 1998

[54] METHOD AND APPARATUS FOR MERGING USER ACCOUNTS FROM A SOURCE SECURITY DOMAIN INTO A TARGET SECURITY DOMAIN

[75] Inventors: Michael M. Swift, Bellevue; Robert Reichel, Redmond; Pradyumna K. Misra, Issaquah; Michael R.C. Seaman, Kirkland; James William Kelly, Redmond, all of Wash.

[73] Assignee: Microsoft Corporation, Redmond, Wash.

[21] Appl. No.: 587,275

[22] Filed: Jan. 18, 1996

[51] Int. Cl.⁶ .................. G06F 13/00; G06F 7/14
[52] U.S. Cl. .................. 395/200.53; 395/187.01; 707/9
[58] Field of Search .................. 395/603, 609, 395/610, 613, 614, 615, 187.01, 188.01, 200.5, 200.51, 200.53, 200.56; 707/3, 9, 10, 102, 103, 104

[56] References Cited

U.S. PATENT DOCUMENTS

| | | | |
|---|---|---|---|
| 4,853,843 | 8/1989 | Ecklund | 395/619 |
| 5,313,465 | 5/1994 | Perlman et al. | 370/254 |
| 5,335,346 | 8/1994 | Fabbio | 395/609 |
| 5,497,486 | 3/1996 | Stolfo et al. | 395/607 |
| 5,577,252 | 11/1996 | Nelson et al. | 395/670 |
| 5,649,194 | 7/1997 | Miller et al. | 395/616 |

*Primary Examiner*—Parshotam S. Lall
*Assistant Examiner*—Viet Vu
*Attorney, Agent, or Firm*—Leydig, Voit & Mayer, Ltd.

[57] ABSTRACT

A method is provided, in accordance with the present invention, for merging a source domain into a target domain in a network. Merging domains comprises replacing a first account identification for each account associated with the source domain by a second account identification associated with the target domain. Next, in accordance with the present invention, for each account associated with the source domain, the first account identification is added to an account security data structure storing account identifications with which the account has previously been associated when associated with a former, merged domain.

16 Claims, 6 Drawing Sheets

FIG. 1

| | |
|---|---|
| Account Name | 50 |
| Current Domain ID | 52 |
| Current Relative ID | 54 |
| Group List (and previous SID list) | 56 |
| Accounts Within Group (for group account) | 58 |
| Certificates | 60 |

Account Security Context Data

| | |
|---|---|
| Current Group #1 Account ID | 62 |
| Current Group #2 Account ID | 64 |
| Current Group #3 Account ID | 66 |
| Prior Account ID | 68 |
| Prior Group #1 Account ID | 70 |

Group & Previous SID List

| DUPLICATED ACCOUNT NAMES | RESOLVED ACCOUNT NAMES | |
|---|---|---|
| | Domain 1 | Domain 2 |
| File_Server | File_Server_1 | File_Server |
| Al | Al_1 | Al |
| Instructors | Instructors_1 | Instructors |
| Printer | Printer_1 | Printer |
| SQL_Server | SQL_Server_1 | SQL_Server |

ACCOUNT NAME CONFLICT RESOLUTION DATABASE

FIG. 5

| INFORMATION TYPE | BEFORE MERGER | AFTER MERGER |
|---|---|---|
| Account Name | AL | AL_1 |
| Domain ID | 1 | 2 |
| Relative ID | 3 | 15 |
| Group List | 1:6 | 2:19; 1:3; 1:6 |
| Certificates | Null | Domain #1 permits Domain #2 to Issue Domain #1 SIDs |

METHOD AND APPARATUS FOR MERGING USER ACCOUNTS FROM A SOURCE SECURITY DOMAIN INTO A TARGET SECURITY DOMAIN

AREA OF THE INVENTION

The present invention generally relates to computer object maintenance facilities, and more particularly to methods for maintaining previously established relationships between computer resources when maintenance objects are reconfigured in a computer network.

BACKGROUND OF THE INVENTION

Networks today typically support a wide variety of users and services, and provide access by the users and services, via individual accounts, to a wide variety of computer resources. The need to restrict access by the individual accounts in a network to certain ones of the computer resources associated with the network is well recognized. Thus, as networks become larger and the spectrum of users, services and network resources broadens, the importance of reliable, conveniently administered, security administration facilities is enhanced. The security administration facilities prevent unauthorized access to protected network facilities. For example, security mechanisms prevent data contained within files stored upon file servers from being accessed or modified by unauthorized users and services.

Access control lists (ACLs) are a well known security mechanism incorporated within network operating systems in order to limit access to protected network resources. The ACLs, which are associated with specific protected network resources, comprise a set of access control entries (ACEs). Each ACE in an ACL identifies a network entity (e.g., an individual user or individual service, or group of users and/or services) and corresponding access rights granted or denied the network entity with respect to the specific protected network resource with which the ACE is associated.

In a known network operating system incorporating ACL based security, a security accounts manager is responsible for creating a security "context" for an individual account (such as a user or service) in response to the presentation of valid credentials for the individual account. The security context formulated by the security accounts manager comprises an account identification as well as a list of group accounts with which the identified account is associated. The account security contexts are stored in a security accounts manager database. When a user or service logs onto a network incorporating ACL security mechanisms, the security accounts manager provides a copy of the security context corresponding to the logged on individual account. The security contexts are used to determine whether to grant access to a protected network resource in response to a user request in accordance with well known security procedures. The individual account identification and the list of group identifications in the context are compared by a server containing the requested network resource to the ACEs stored on the requested network resource in order to determine whether to grant the requested access.

As networks become larger and the number of accounts, connected machines, and resources increases, the complexity of the task of administering the security databases for the accounts and resources provided by the connected machines on the local area networks increases. The task of administering the accounts and the protected network resources accessed by users is decentralized by partitioning the accounts and resources within the network (e.g., resources and accounts) into collections—referred to as "domains."

As will be known to those skilled in the art, the term "domain" has a particular meaning in the context of MICROSOFT network operating systems. However, when used to describe the invention without reference to a specific network operating system, the term domain is intended to encompass similar network entities for establishing collections of accounts, and uniquely identifying individual accounts within the established collections (e.g., "realms" or NETWARE "directory trees").

Thus, a domain, in the context of the present invention comprises a cooperatively administered collection of accounts and resources within a network. It is noted that the term "cooperatively" refers to the enforcement of account identification policies within a domain such that all accounts are uniquely identified within a same collection (i.e., domain). As will be appreciated by those skilled in the art, a domain may include more than a single domain controller, and in fact, a controller may only administer a portion of the entire collection of accounts associated with a domain (e.g., NETWARE "directory tree" controllers).

Domains are especially invaluable in large corporate-wide networks since they facilitate the partitioning of network resources and users of the resources into smaller, more easily managed, sub-collections of resources within the network that are typically accessed by a particular sub-collection of accounts. For example, a network for a large organization having the above described domain identification capability is typically partitioned into a number of domains arranged along corporate groups. A domain controller for each domain maintains a list containing individual and group account identifications. In order to facilitate identification of accounts with particular domains, each account identification for a user account or group account includes (1) a domain identification which distinctly identifies the domain with which the account is associated from other network domains, and (2) a "relative identification" which distinctly identifies the account from other accounts having a same domain identification.

In an organization having multiple network domains, a source domain may be merged into a target domain. Such a reorganization may occur in response to a corporate reorganization or when resources of two separate corporate groups are consolidated for a project. In known network operating systems, when a source domain is merged into a target domain, a new account is created in the target domain for each account in the source domain, and each merged source domain account is assigned a new account identification corresponding to the new account. The new account identification includes a new domain identification corresponding to the target domain. Each new account identification also includes a new relative identification which uniquely identifies the account within the target domain from other accounts associated with the target domain.

Merging accounts associated with a source domain into a target domain in an established network presents a significant administration problem. Protected network resources having ACEs specifying account identifications for accounts formerly associated with the source domain (before the merger) initially do not contain the new account identifications for the merged source domain accounts. Therefore, the ACL data structures are updated with the new account identifications assigned to the source domain accounts during the merging process.

Modifying every ACL for the protected network resources containing an account identification corresponding to one of the merged source domain accounts is not a trivial task for a domain administrator in view of the likely existence of a large number (possibly thousands) of ACLs on the network resources containing ACEs identifying accounts formerly associated with the merged source domain. The process of updating ACLs is further complicated by the fact that a number of the machines containing the protected network resources having ACEs specifying the source domain may be off-line, or the protected network resource (such as archived data) is unavailable when an attempt is made by a merging tool to update the ACEs in accordance with the domain merge operation. The merged accounts are denied access to the protected network resources until the corresponding ACEs are updated to incorporate the new account identifications.

Account names, in contrast to account identifications, are specified by users and services to identify a user, service or group to the network operating system. For example, a user specifies the name of an account in order to log onto the network. Account names may exist in the source domain, prior to the merger, that are identical to names assigned to accounts already present in the target domain. When the source domain accounts are merged into the target domain, the existence of accounts having the same account name presents the problem of distinguishing the accounts from one another whenever the duplicated account name is provided to identify the source of a request, such as for example, when a user logs onto the network.

A user or service having an account associated with a first domain in a network may request access to a protected network resource on a machine associated with a second domain within the network. In such an instance, if the domain controller for the second domain has established a trusting relationship with the first domain whereby the second domain trusts the first domain to provide valid security contexts for properly authenticated users and services, then an appropriate response will be furnished by the protected network resource in the second domain. The response is based upon the content of the ACL on the protected network resource and the security context that accompanies the request. When a source domain is merged into a target domain, the trust relationships established by the source domain with other domains may be lost. As a consequence, users and services having accounts on the source domain, that have access to the network resources of a foreign domain by means of a trusting relationship between the foreign domain and the source domain, may lose access to these resources when the source domain is merged into the target domain.

SUMMARY OF THE INVENTION

It is a general object of the present invention to minimize the effect of a domain merger upon the access of merged accounts to protected network resources.

It is another related object of the present invention to maintain previously established trusting relationships between a source domain and other domains in the network even after the source domain merges into a target domain.

In view of the above-mentioned and other objects that will be apparent in view of the description of a preferred embodiment of the invention below, the present invention comprises a method for merging a source domain into a target domain in a network. More particularly, the method for merging domains in accordance with the present invention comprises replacing a first account identification for each account associated with the source domain by a second account identification associated with the target domain. Next, for each account associated with the source domain, the first account identification is added to an account security data structure comprising account identifications with which the account has previously been associated.

In a specific embodiment of the present invention an account identification is appended to a list of account identifications with which the account has been or is currently associated. The list is updated each time the account is assigned a new account identification.

Also in accordance with a specific embodiment of the present invention for merging a source domain into a target domain, names assigned to source domain accounts and the names assigned to target domain accounts are consolidated. Consolidation of the account names comprises identifying account names that exist in both the source domain and target domain. The name conflict is resolved by changing at least one of the account names for each identified pair of duplicated account names.

In accordance with an aspect of a preferred embodiment of the present invention, when a source domain is merged into a target domain, the source domain issues a "certificate" to the target domain. The "certificate" is a piece of data that is: (1) virtually immune to forgery, and (2) notifies recipients of a request including the certificate that the target domain is authorized to issue contexts for accounts containing SIDs identifying the source domain. The certificate provides a method for transferring trusted status to a target domain without compromising network security.

After the merger, users and services having accounts previously associated with the source domain, request resources from other domains with which the source domain had established trust relationships prior to the merger of the source domain into the target domain. In accordance with a particular embodiment of the invention, the authenticity of the source domain account identifications contained in the contexts accompanying the requests from the merged (former source domain) accounts is verified by the trusting domains via public key authentication of the certificate (created via the source domain's private key). The public key is issued by the source domain to each of the trusting domains in the network after a trusting relationship is established from the trusting domains with the trusted source domain.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE PREFERRED EMBODIMENT

Figure 1:
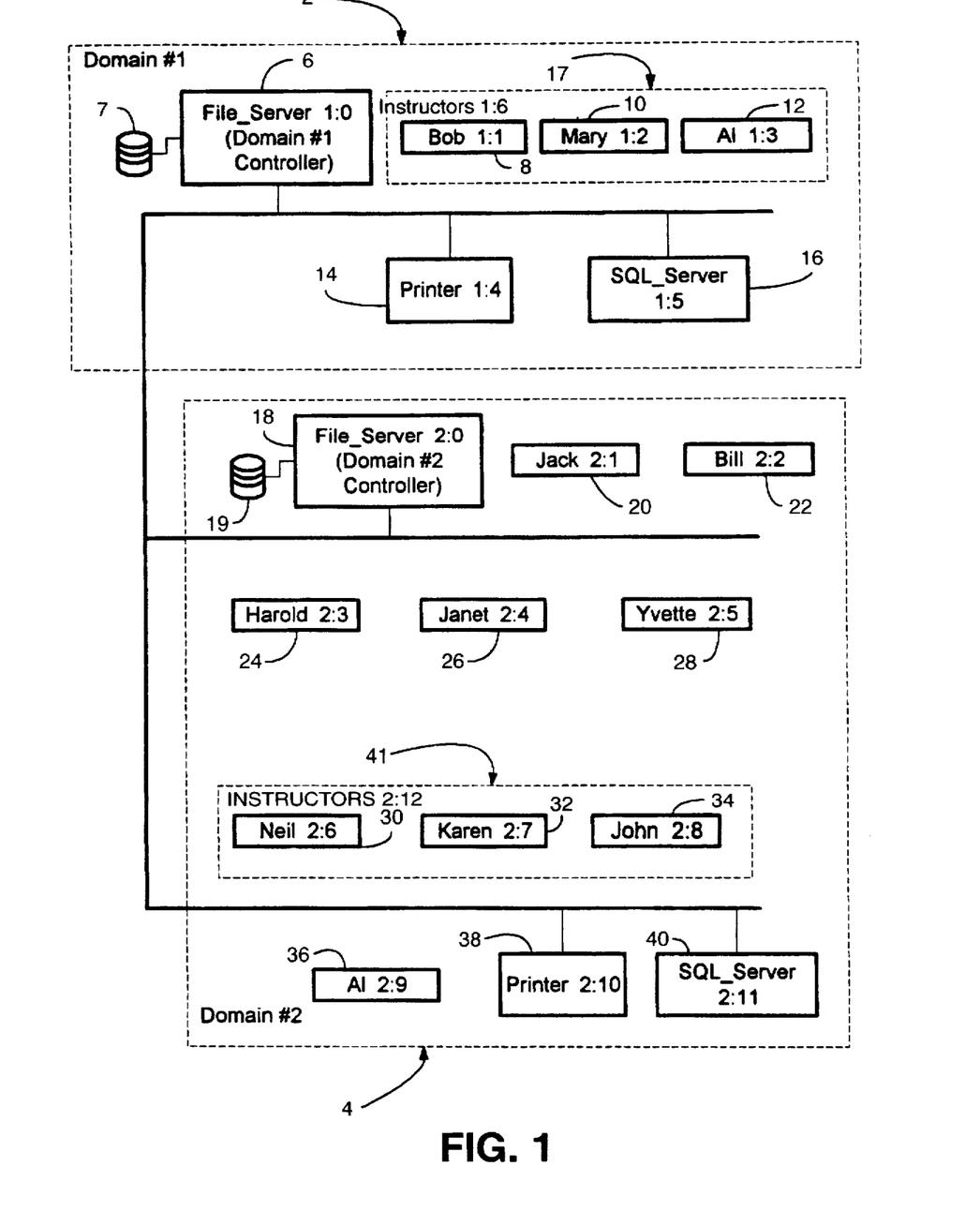
FIG. 1 is a schematic drawing of a network comprising multiple domains.

Turning now to FIG. 1, a schematic drawing is provided of a network comprising a Domain #1 and a Domain #2. Associations of physical network entities and accounts with Domain #1 and Domain #2 are indicated by ghost outline boxes 2 and 4 respectively. Domain #1 includes a File Server 6. The File Server 6, in addition to performing known file server functions, also performs known functions associated with a domain controller for Domain #1. In accordance with an illustrative embodiment of the present invention, the File Server 6 includes user and service account authentication facilities enabling the File Server 6 to verify logon credentials and, in response, issue a security context to an authenticated user or service. Such logon operations are provided by a domain controller in the well known Windows™ NT operating system.

The File Server 6 accesses a directory service of objects database 7 ("database 7") which is preferably stored on a hard drive accessed by the File Server 6, in order to authenticate user and service logon credentials and provide security contexts after authenticating the logon credentials. The database 7 stores known account information enabling the File Server 6 (the Domain #1 controller) to authenticate user and service logon names and associated passwords and then build security contexts for the authenticated logged on users and services. Thus, the database 7 is accessed by the File Server 6 (in its role as the Domain #1 controller) in order to authenticate user and service account credentials and to create a security context when a user or service, such as User 8, 10, or 12, attempts to log onto the Domain #1.

Each account has an associated Account Name, Domain ID and Relative ID. For example User 8 has an Account Name "Bob," a Domain ID "1" and a Relative ID "1." User 12 has an Account Name "Al," a Domain ID "1" and a Relative ID "3." Domain #1 includes a Print Server 14 (having an Account Name "Printer") and an SQL Server 16. Domain #1 also includes a Group 17 including Users 8, 10 and 12 and having a name "Instructors."

Domain #2, enclosed by the box 4, includes a File Server 18. The File Server 18, which also performs the functions described above associated with a domain controller, also includes a directory service of objects database 19 ("database 19"). Database 19 contains the same type of account security information described above for the database 7. The information in the database 19 facilitates authentication of user and service logons by the Domain #2 controller (File Server 18) and creating security contexts for authenticated logged on users and services associated with Domain #2. Domain #2 comprises Users 20, 22, 24, 26, 28, 30, 32, 34, and 36. Domain #2 also comprises a Print Server 38 and an SQL Server 40. Domain #2 also includes a Group 41 comprising the Users 30, 32 and 34. The Group 41 has the name "Instructors."

It is noted that while a number of account names in Domain #2 are the same as account names in Domain #1, these account names represent distinct network accounts. Therefore, when Domain #1 is merged into Domain #2, the account name corresponding to at least one of each of the duplicated account names is modified by a merging tool in order to facilitate distinguishing the distinct network accounts when Domain #1 and Domain #2 merge into a single domain.

Figure 2:
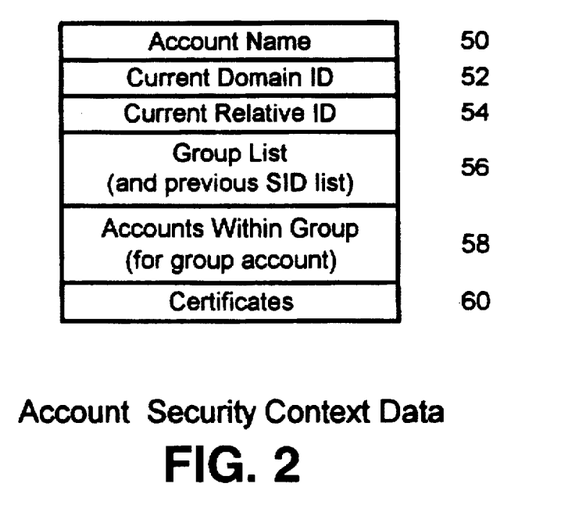
FIG. 2 is a schematic drawing illustratively depicting identification information associated with an account, including a list of account identifications with which a particular account is associated, the list including account identifications previously assigned to the account.

Turning now to FIG. 2, a set of fields schematically depict the information associated with an account maintained by a directory service of objects associated with a domain controller in accordance with the present invention. The information summarized in FIG. 2 is used to build a security context for an account. Such information, in the case of a user account, accompanies requests by logged on users for protected network resources.

Much of the account information depicted in FIG. 2 is well known to those skilled in the art. However, a noteworthy exception to the known information that accompanies user and service requests is the appended security identifiers (SIDs) with which an account has previously been associated in a merged domain. Furthermore, in cases where a user or service submits a request to a protected network resource associated with another domain, the request may include one or more "certificates."

A "certificate," as explained above, is a piece of data, essentially immune to forgery, notifying recipients of requests issued by target domain users and services to other domains that the target domain is authorized to issue contexts containing source domain SIDs. Certificates, as a consequence of their non-forgeable nature, authenticate the permission granted to the target domain to issue contexts for target domain accounts that include source domain SIDs. Such a mechanism is useful in the context of the present invention since it ensures that merged accounts from the source domain have continued access to resources in other domains after the source domain accounts have been merged into the target domain. In the event that an account is merged more than one time, it is contemplated that both a new certificate and all previous certificates will be saved in order to maintain all previously established trusting relationships.

As will be known to those familiar with the MICROSOFT® WINDOWS™ NT operating system, an Account Name field 50 specifies a name corresponding to an account that uniquely identifies the account within a domain with which the account is associated. The domain with which an account is associated is identified by a Current Domain ID 52. An account's Current Domain ID 52 distinguishes the account from other accounts associated with different domains within a same network having a same account name or relative identification (stored in field 54 described below). For example, in FIG. 1, a logon request originating from User 12 ("AL") is distinguished from a logon request from User 36 (also having the name "AL") by the association of the User 12 with a unique Domain #1 identification which is distinguished from the Domain #2 identification. Likewise, the Current Domain ID 52, in combination with a relative identification for a specific account, uniquely identifies the account within a network wherein other accounts contain a same relative account identification.

Continuing with the description of FIG. 2, the directory services of objects also includes, for an account, a Current Relative ID field 54. The value stored in the Current Relative ID field 54 is an internal representation of an account within a domain (identified by the current Domain ID 52). The Current Domain ID 52 and the Current Relative ID 54 together make a security identifier (or SID). A SID uniquely identifies an account within a network. The SID for the User 12 is "1:3."

In the preferred embodiment of the present invention, a account can be associated with other accounts for purposes of accessing protected network resources. This associated set of accounts is referred to as a "group" account. A group account is a collection of individual and/or group accounts that are collectively granted (or denied) a defined set of access rights to protected network resources based upon ACEs stored on the network resources identifying the group account. Group accounts facilitate reducing the number of ACEs stored on protected network resources by grouping a number of accounts, having the same access rights to protected resources in the network, under a single group account. The single group account identification and access rights are placed within an ACE for a network resource in order to define the access rights for all members of the group on the network resource. A group account itself may be a constituent of another group account. The network in FIG. 1 includes Group 17 and Group 41 (both of which are named "Instructors").

Having described a group account, the directory service of objects incudes, for an account, a Group List 56. The Group List 56 includes a list of group account SIDs corresponding to the groups with which the account is associated in its current domain. Therefore, when an account is merged into a new domain, new group SIDs are added to the Group List 56 which correspond to the new SIDs for the transferred group accounts. The group SIDs that were present within the Group List 56 before the account was merged into a new domain are retained in the Group List 56.

Furthermore, in accordance with the preferred embodiment of the present invention, if an account is transferred to a new domain during a domain merge operation, then the former SID for the account is appended to the Group List 56. The transferred account is associated with a new Domain ID corresponding to the new domain and a new relative ID is inserted within the Current Relative ID field 54 for the transferred account. Each time the account is transferred to a new domain (necessitating assigning a new SID to the account), the former SID is added to the Group List 56 by a merging tool. The former SIDs are present in security contexts accompanying user or service requests and therefore enable users and services to maintain access to protected network resources when the ACLs of the protected network resources have not been updated to include the new SIDs assigned to transferred accounts during a domain merge procedure.

The information maintained by the directory service of objects for a group account in a domain also includes an Accounts Within Group List 58. The Accounts Within Group List 58 includes the current names and SIDs of all constituents of the group account. As will be further explained below, when a domain merges into another domain, the names of accounts may overlap. In such a case, at least one of the duplicated account names must be renamed. If the renamed account is a member of any groups, then the new name must be entered within the appropriate field of the Accounts Within Group List 58.

It is known for protected network resources to include ACEs granting (or explicitly denying) access to accounts associated with domains, other than the domain with which the protected network resources are associated, based upon trust relationships established between domains. Therefore, when a source domain is absorbed into a target domain during a domain merge operation, trust relationships established by the source domain with the other domains are passed to the target domain when the target domain controller stores the old account SIDs in the Group List field 56 for each transferred account, and a corresponding certificate is issued. The target domain controller thereafter issues security contexts including the old account SIDs.

In a system where it is possible to transfer trust relationships to another domain, a danger exists that a domain controller will issue security contexts including SIDs identifying another domain when in fact the domain controller has not received such authority (to issue SIDs of the other domain). Therefore, in accordance with an embodiment of the present invention, certain safeguards are incorporated to enable protected network resources to verify the authenticity of a merged account's SID contained in a security context for a user or service request from another domain.

In order to prevent unauthorized access to protected network resources through the unauthorized issuance of security contexts for user or service accounts described above, the information maintained by the directory service of objects relating to account security includes a list of Certificates 60. Only a single list of Certificates 60 is maintained within each directory service of objects. When a source domain is merged into a target domain, the source domain provides a certificate to the target domain. The providing of the certificate from the source domain endows the target domain with the trust relations established by the source domain with trusting domains in a network with respect to the merged accounts.

Those skilled in the art will understand that there are a number of alternative ways in which to render an authentication message essentially immune to forgery in accordance with the above defined "certificate." However, in the preferred embodiment of the invention the certificates are created and verified according to the well known RSA public key encryption algorithm in order to prevent forgery. More particularly, in the preferred embodiment of the invention, a non-encrypted form of the certificate is encrypted by the source domain using a private key. The resulting certificate is then passed to the target domain and stored in the list of Certificates 60.

Thereafter, a merged source domain certificate is included within a security context issued by a target domain controller to a user or service during logon if the user or service was associated with the merged source domain before the merger of the source domain into the target domain. Thereafter, recipients in trusting domains (of the source domain), upon receiving a request containing the security context, verify the authority of the target domain controller to issue the security context containing the source domain SIDs by applying a public key corresponding to the source domain's private key, to the certificate.

Figure 3:
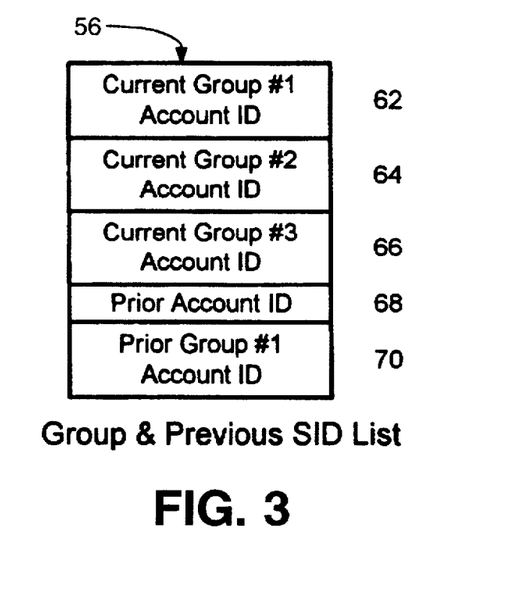
FIG. 3 is a schematic drawing of an illustrative group list for an account wherein the group list includes entries corresponding to previous account identifications assigned to the account as well as a previous group account identification for a group account with which the account is associated.

Turning briefly to FIG. 3 an illustrative example is provided of values included in a Group List 56 for an account. In the example, the account is a member of three groups associated with the current domain identified by SIDs in Group list entries 62, 64 and 66. In addition, the account has been associated with at least one previously merged domain. This is evidenced by a Prior Account ID 68 containing a SID previously assigned the account prior to the transfer of the account to the current domain. Prior Group #1 Account ID 70 contains a SID assigned the Group #1 Account, of which the account is a constituent, prior to the transfer of the Group #1 Account to the current domain.

In the preferred embodiment of the present invention, an administrator has the capability to delete prior SIDs from a group list for an account. Such entries are preferably removed after the administrator has ensured that the protected network resources have updated ACLs and will therefore recognize requests from the transferred account via the new SID corresponding to the domain into which the account has been transferred.

Figure 4:
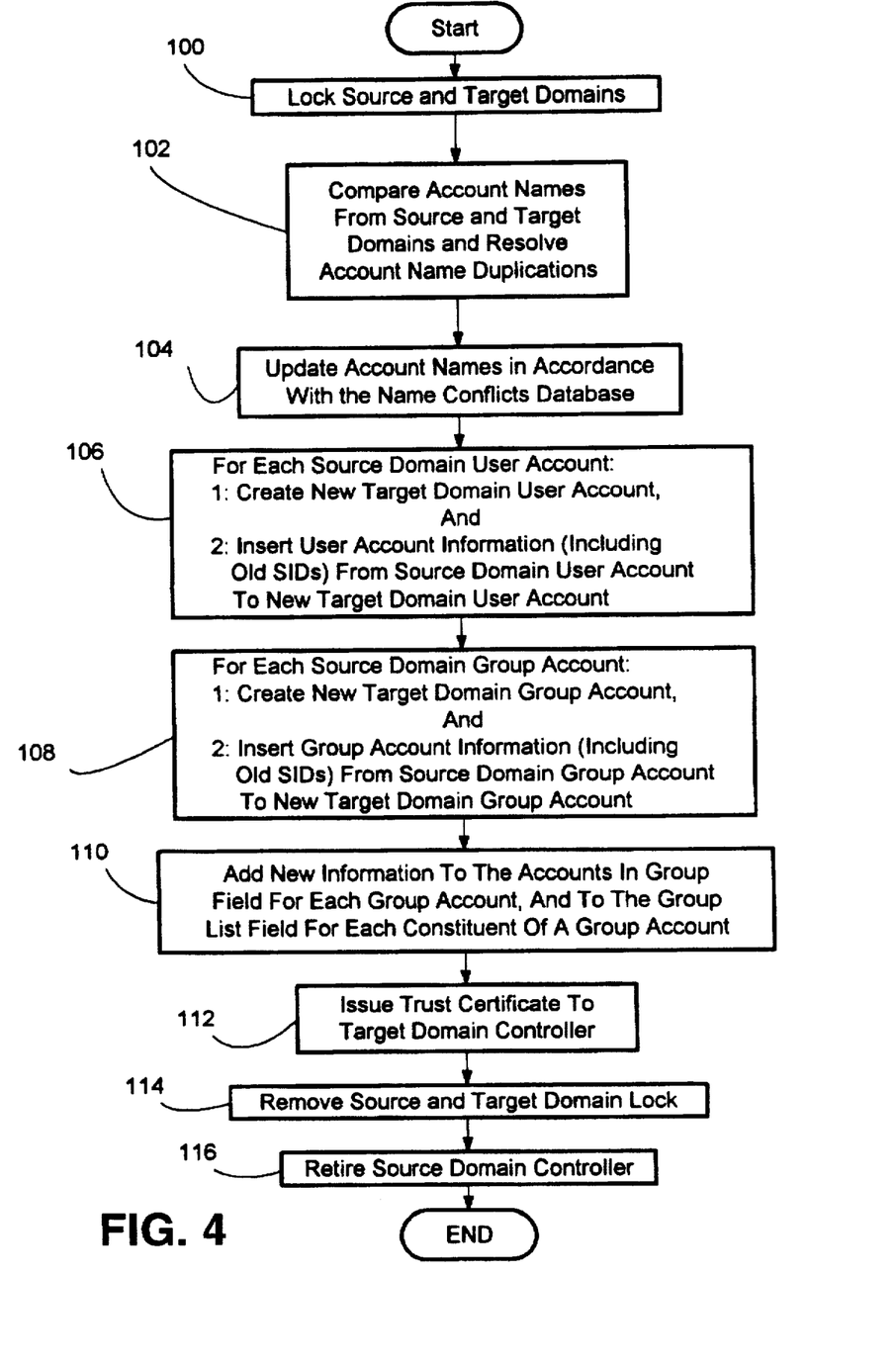
FIG. 4 is a flow chart illustrating the steps for merging a source domain into a target domain.

Having described an illustrative network including multiple domains and a preferred means for maintaining account security information, attention is now directed to FIG. 4 comprising a summary of the steps performed by a domain merging tool, in conjunction with domain controllers for a source domain and target domain, in order to merge a source domain into a target domain in accordance with a preferred embodiment of the present invention. In the steps described below, reference is made to the illustrative network depicted in FIG. 1. It is noted that the network illustrated in FIG. 1 is relatively small and resort to the present invention to merge two domains in such a network environment is unlikely. Instead, the network depicted in FIG. 1 is provided for purposes of describing the merger of a source domain into a target domain in accordance with the present invention. A more typical network embodying the present invention includes tens, hundreds, or even thousands of accounts and protected network resources.

At step 100, in preparation for merging Domain #1 (the "source domain") into Domain #2 (the "target domain"), the merging tool requests the domain controllers 6 and 18 to lock membership in their respective domains in order to prevent changes to security information, other than the changes initiated by the merging tool, relating to the merging domains during the merge process. Users and services may still logon, and account statistics (such as last logon date/time) may be updated. However, if a non-merge related change occurs with respect to the entities represented in the source or target domain, then the change is delayed or the merge procedure re-started in order to accommodate the change. Locking the membership in the source and target domains ensures that all accounts are properly merged and contain no duplicated account names. Control then passes to step 102.

At step 102, a merging tool obtains the names of the accounts associated with Domain #1 from the database 7 and the names associated with Domain #2 from the database 19. The merging tool compares the lists of account names to ensure that none of the account names in Domain #1 matches an account name that is already present in Domain #2 when Domain #1 accounts are merged into Domain #2. If an account name from Domain #1 matches an account name in Domain #2, then the account name is entered into an account name conflict resolution database. The merging tool resolves the name match (conflict) by changing at least one of the names. The resolved account names for the Domain #1 and Domain #2 accounts are stored in appropriate fields in the account name conflict resolution database.

Referring again to the network in FIG. 1 it is noted that a number of the account names in Domain #1 are also assigned to accounts in Domain #2. In particular, both domains include the following account names: File_Server; Al; Instructors; Printer; and SQL_Server. Therefore, during step 102, the merging tool creates initial entries in the account name conflict resolution database as shown in the left-most column in FIG. 5.

Figure 5:
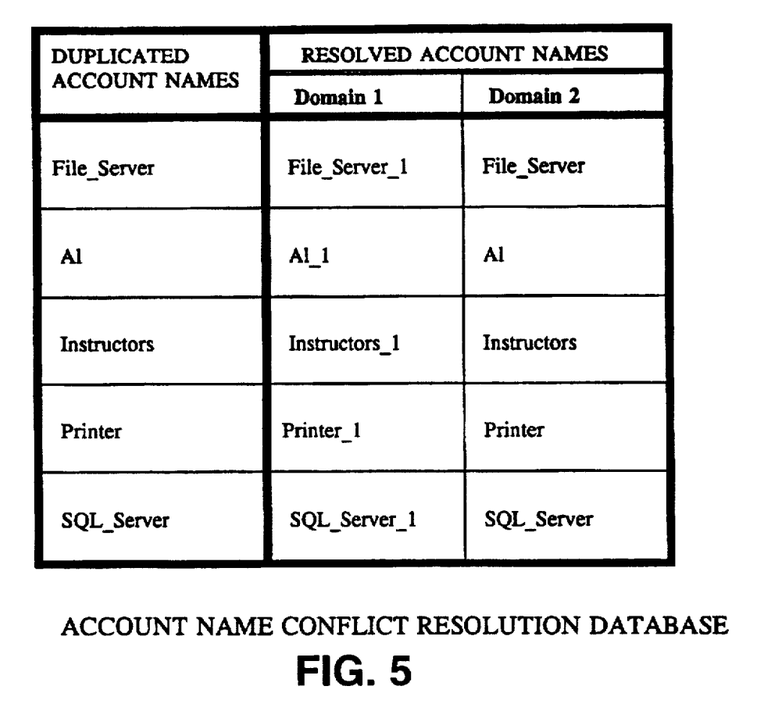
FIG. 5 is a schematic drawing of an account name conflict table generated for purposes of executing a domain merge.

Furthermore during step 102, as shown in FIG. 5, the merging tool selects new account names in order to eliminate the account name matches. The merging tool initially attempts to eliminate an account name match by adding the extension "_1" to the duplicated account name from the source domain (Domain #1) in order to generate a new, possibly non-conflicting account name. The Domain #2 controller 18 then searches the current list of names assigned to all accounts from Domain #1 and Domain #2. If the new account name does not match a current account name in either of the merging domains, then the name is saved in the Account Name Conflicts Database. If a match is found even after the "_1" extension is appended to the source domain account name, then the extension "_2" is appended in order to provide yet another temporary new name which is compared to all of the other account names in Domain #1 and Domain #2. The extension number is increased until a non-conflicting name is obtained. An administrator may override a non-conflicting name provided by the above described automated re-naming procedure. It will be appreciated that while a name conflict resolution method has been described, other suitable methods for eliminating account name duplication will be known to those skilled in the art.

As shown in FIG. 5, none of the target domain account names have been modified, and the account names for the duplicated names of source domain (#1) accounts have been modified by adding the extension "_1" to each duplicated name. Thus, the merging tool has assigned File Server 6 in Domain #1 the name "File_Server_1." User 12 has been assigned the account name "Al_1", and Group 17 has been assigned the new account name "Instructors_1." Print Server 14 has also been assigned the account name "Printer_1." Finally, SQL Server 16 has been assigned the unique new account name of "SQL_Server_1." Having generated the new account names to be assigned to the associated accounts, control then passes to step 104.

At step 104, the names of accounts in Domain #1 are modified based upon the new names assigned to accounts during step 102 in order to resolve account name duplications. In particular, the names stored in the Account Name field 50 of Domain #1 accounts are renamed in accordance with the resolved account names listed under the column heading "Domain 1" in FIG. 5. Thus for example, the account name "Al" is renamed "Al_1" in the Account Name field 50 for the User 36. Also during step 104, the Accounts Within Group List 58 is updated in each group account in accordance with the name changes in the Domain #1 column of FIG. 5. Thus, the Accounts Within Group List 58 in the account information for the Group 17 named "Instructors_1" is modified to reflect the change in the account name for User 36 from "Al" to "Al_1." After all of the account names have been resolved, control passes to step 106.

At step 106, new individual (user and service) accounts are created in the target domain (Domain #2) database 19 corresponding to each of the individual accounts currently associated with the source domain (Domain #1), and the account information (such as that represented in FIG. 2) associated with the corresponding source domain individual accounts is inserted into the new individual accounts in order to affect a transfer of individual accounts from the source domain to the target domain. In particular, during step 106, the Domain #2 controller 18 creates target domain accounts. Account names corresponding to the current names of source domain individual accounts are inserted within the Account Name field 50 of the new target domain accounts. The Current Domain ID 52 for each of the new individual accounts corresponds to the Domain #2. Because every individual account within the database 19 is a member of Domain #2, there is no need to explicitly save the domain ID value separately for each individual account.

Also during step 106, the Domain #2 controller 18 inserts, within the Current Relative ID field 54 for each new individual account data structure, a unique target domain relative identifier integer value. In the present example, six individual accounts are merged from Domain #1 into Domain #2. Since the relative identifier integer values "0" through "12" are already assigned to existing accounts in Domain #2, the relative identifications assigned to the new individual accounts include the available unique integer values "13" through "18." Referring to FIG. 1, during step 106 the merged accounts corresponding to the Users 8, 10 and 12 are assigned new account SIDs 2:13 (domain ID:relative ID), 2:14 and 2:15 respectively.

Furthermore during step 106, the merging tool builds a temporary merging table containing entries corresponding to the merging Domain #1 accounts. Each entry comprises a merged account name. It is noted that in the event that a name for a merged account is changed, the new account name is placed in the temporary merging table. In addition, each entry for a merged account includes an old relative ID corresponding to the account in Domain #1 and a new relative ID corresponding to the account in Domain #2. For example, when an account is created in Domain #2 for the User 8 during step 106, the merging tool creates an entry in the temporary merging table having a name "Bob", an old relative ID of "1", and a new relative ID "13." Though the temporary merging table is not necessary for carrying out the present invention, it reduces the searching performed by the merging tool in order to locate relative IDs corresponding to merged account names during later steps of the domain merge process.

Also during step 106, additional account-specific information is inserted in the new individual accounts. For example, the password for each source domain individual account is inserted into the corresponding new target domain account. Examples of other transferred account specific information, that are not associated directly with the application of ACL-based security to logged on users and services, include comments and access limitations relating to the particular account that are accessed by an account administrator. Other account-specific information, not necessarily tied to ACL security, copied to the new individual accounts will be known to those skilled in the area of network operating system design.

In an operating system utilizing an Access Control List (ACL) based resource protection scheme (such as the WINDOWS™ NT operating system), it is not likely that all the ACLs will be updated immediately after a domain merge. As a result, when domains are merged and an account is assigned a new SID, access to protected resources using ACLs based upon the old SID will be lost. Therefore, adding a previously used SID to the account security data structure and creating a context based upon both the new and previously used SIDs for an account ensures that access to any protected resource is maintained (via the stored previous SID) even after the domain with which the account was previously associated is merged into another domain.

In order to facilitate continued access by users and services to network resources that do not have updated ACLs, during step 106 the merging tool copies the Domain #1 ID and the relative ID, which in combination form the former SID, for each merged individual account into a corresponding new individual account in Domain #2 (the target domain). In the preferred embodiment of the present invention, the former account SID is stored in the Group List 56 of a new individual account in Domain #2 corresponding to the merged account. Thus, for example, during step 106 the merging tool copies the SID 1:1, previously assigned to the User 8 ("Bob"), to the Group List 56 within the new account in Domain #2 for the User 8 having a new SID 2:13. It is noted that while in the preferred embodiment of the present invention the old SID is placed in the Group List 56 of the corresponding new individual account in Domain #2, in alternative embodiments of the invention the old SID will be placed in some equally acceptable alternative location referenced by network security systems in order to determine other security identifications with which an account has been, or is currently, associated.

In order to further ensure that previous access rights for an individual account are maintained regardless of whether ACLs for protected network resources are updated to reflect the merger of Domain #1 accounts into Domain #2, all SIDs in the Group List 56 for a Domain #1 individual account currently stored in the database 7 are copied to the Group List 56 for a corresponding Domain #2 account within the database 19. Referring for example to FIG. 1, since the User 8 is associated with the Group 17 having a current SID "1:6," the SID "1:6" is copied to the Group List 56 for the new User 8 account in the Domain #2 database 19.

In addition, the Group List 56 is a depository of SIDs previously assigned to a merged account in accordance with the preferred embodiment of the present invention. As a consequence, in addition to SIDs of groups in Domain #1 of which the account is a member, the SIDs within the Group List 56 of a Domain #1 account may include (1) a former SID for the merged account or (2) a former SID corresponding to a group account of which the merged account was a constituent in a previously merged domain. All such SIDs are copied from the Group List 56 for the Domain #1 account to the Group List 56 for the corresponding new Domain #2 account.

After creating new individual accounts in the target domain (Domain #2), control passes to step 108 wherein new group accounts are created in the target domain corresponding to group accounts currently associated with the source domain (Domain #1), and the account information (such as that represented in FIG. 2) associated with the source domain group accounts is inserted into the new group account data structures in the database 19 in order to affect a transfer of group accounts from the source domain to the target domain. The operations performed in association with step 108 are very similar to the above described step 106.

During step 108, the Domain #2 controller 18 creates new target domain group accounts. Account names corresponding to group accounts in the source domain are inserted within the Account Name field 50 of the new target domain accounts. For example, the name "Instructors_1" is inserted within the Account Name field 50 of the new group account created in Domain #2 during step 108. The Current Domain ID 52 with which the new group accounts are associated corresponds to the Domain #2 domain identification—which in the illustrative embodiment is the value "2."

Also during step 108, the Domain #2 controller 18 assigns relative identifier values to the new target domain group accounts which uniquely identify the group accounts from other domain #2 accounts. Referring again to the illustrative example in FIG. 1, since Domain #1 has only one group account, only one additional account is created. The new group account in Domain #2 is assigned the relative ID "19." The relative identifier "19" is stored in the Current Relative ID field 54 of the new group account in Domain #2 for the Group 17. The SID for the new group account is thus "2:19" (domain ID:relative ID).

During step 108, the merging tool also adds new entries, corresponding to the new group accounts in Domain #2, to the above described temporary merging table. Referring again to the example where Domain #1 is merged into Domain #2 (illustratively depicted in FIG. 1), a new entry including the name "Instructors_1" is added to the temporary merging table along with its Domain #1 relative ID "6", and its Domain #2 relative ID "19."

In order to ensure that previous granted and denied accesses are maintained for a merged group regardless of whether ACLs identifying the merged group accounts have been updated to reflect the merger of the source domain group accounts into the target domain, during step 108 the merging tool copies an old SID for each merged group account from the source domain (Domain #1) into the Group List 56 for the corresponding new group account in the target domain (Domain #2). Referring to FIG. 1, the SID "1:6" for the Group 17 is copied into the Group List 56 of the Domain #2 group account for the Group 17 having a new name "Instructors_1" and a new SID "2:19".

All SIDs stored in the Group List 56 for each group account currently stored in the database 7 are also copied to the Group List 56 of each corresponding new group account in the database 19. As described above, in the preferred embodiment of the present invention, the Group List 56 is a depository of SIDs previously assigned to a merged account. As a consequence, in addition to SIDs of groups in Domain #1 of which the account is a member, the SIDs within the Group List 56 of the merged Domain #1 group account may include (1) a former SID for the merged group account or (2) a former SID corresponding to a group account of which the merged group account was a constituent in a previously merged domain. All such SIDs are copied from the Group List 56 for the Domain #1 group account to the Group List 56 for the corresponding new Domain #2 group account.

Next, at step 110, the merging tool adds the names and new SIDS corresponding to the constituent accounts of each new target domain group account created during step 108. Using the Accounts Within Group lists (58) for merged Domain #1 group accounts as a guide, the merging tool accesses entries within the temporary merge table (containing the Domain #2 account name, Domain #1 relative ID, and the Domain #2 relative ID for each Domain #1 account) in order to fill in the new Accounts Within Group lists (58) for corresponding Domain #2 group accounts.

In particular, for each Domain #1 account listed within an Accounts Within Group list for a Domain #1 account, the merging tool identifies a corresponding Domain #2 account name and Domain #2 account RID within the temporary merge table. The Domain #2 account name and Domain #2 SID (based upon the identified RID for a constituent account) are inserted into the Accounts Within Group list of a corresponding Domain #2 group account created during step 108.

It is noted that an Accounts Within Group list for a particular group account may include non-Domain #1 SIDs. In the preferred embodiment of the invention, these non-source domain SIDs are transferred to the new Accounts Within Group list for the corresponding Domain #2 group account. However, because their associated domain has not merged into Domain #2, the non-Domain #1 SIDs are not modified and are merely copied into the Accounts Within Group list of a new Domain #2 group account corresponding to a merged Domain #1 group account.

Referring to the example in FIG. 1, during step 110, the merging tool locates the RIDs 1, 2, and 3 (corresponding to the account names "Bob," "Mary," and "Al_1") within the temporary merge table. The corresponding Domain #2 SIDs 2:13, 2:14 and 2:15 are placed into the list entries in the Accounts Within Group list 58 for the Group 17 along with the corresponding account names "Bob," "Mary," and "Al_1."

Also during step 110, the merging tool updates the Group List 56 of each constituent (Domain #2 account) of a merged group account to include the Domain #2 SID assigned to the merged group with which an account is associated. Referring again to the merger of the Domain #1 into Domain #2 illustrated in FIG. 1, the merging tool adds the SID "2:19" (corresponding to the Group 17) to the Group List 56 within the account entry in the database 19 for the account named "Bob." The same procedure is followed to place the SID "2:19" within the Group List 56 for the accounts having the names "Mary" and "AL_1" in the database 19.

It is known to divide a large network into a set of domains. This capability is provided for example in the WINDOWS™ NT network operating system. It is also known for domain controllers to establish trust relations between domains. A trust relationship wherein a second domain trusts a first domain enables users and services in the first domain to request protected network resources associated with the second domain. Access to the protected network resources of the second domain is determined by the context associated with the user or service which originated the request. Because of the trust relationship, the protected network resources in the second domain rely upon a domain controller in the first domain to issue valid contexts to the logged on users and services in the first domain.

In order to maintain trust relationships between a source domain (which will no longer exist after a merger is completed) and other network domains, in a preferred embodiment of the present invention the source domain controller issues a certificate to the target domain controller stating, in effect, that the source domain has transferred its authority to issue SIDs identifying the source domain and any other authority the source domain controller may have acquired to issue SIDs in the name of other previously merged domains. By passing the above described authority to the target domain controller during the merger of the source domain into the target domain, the merging tool preserves the established trust relations wherein other domains trusted the source domain controller to issue contexts having authentic and valid SID information.

Continuing with the description of FIG. 4, at step 112, the Domain #1 controller completes the merger of the security portions of the domains by issuing the above described certificate to the Domain #2 controller, thereby enabling users and services having accounts on the merged Domain #1 to continue having access to other domains which had trusted the Domain #1 controller 6 to issue valid security contexts. The certificate enables all recipients of requests from the merged Domain #1 individual accounts to verify that the Domain #2 controller 18 has been authorized by the Domain #1 controller 6 to issue contexts including former SIDs which were stored in the Group List 56 of each current target domain account created from an account merged from Domain #1 during the above described merger steps. As previously described, in a preferred embodiment of the present invention, the certificates are rendered virtually immune to forgery by incorporating the well known RSA public key encryption procedures into the steps of issuing and interpreting the certificates.

The certificates embody a transitive property enabling the chaining of certificates in order to establish an authority for a particular domain controller to issue contexts including SIDs identifying another domain. For example, if Domain #1 transfers a certificate to Domain #2 during a merger of Domain #1 into Domain #2, and Domain #2 transfers a certificate to Domain #3 during a merger of Domain #2 into Domain #3, then Domain #3 will be authorized to issue SIDs including the domain ID for Domain #1. As a consequence, trust relationships can be effectively maintained even when a large number of mergers are performed upon a group of accounts in a relatively short period of time.

After the source domain controller 6 issues the certificate during step 112, the merger of the domain security for the source and target domains is complete. There is no longer any need to lock the contents of the source and target domains, and therefore the lock is removed during step 114. Control then passes to step 116 wherein the Domain #1 controller 6 is retired, and the Domain #2 controller temporarily takes on the added responsibility of responding to logon requests from users and services identifying Domain #1.

It is noted that after the accounts of a source and target domain have been merged in accordance with the steps described above, the users and services previously associated with the source domain (Domain #1) will likely not be aware of the merger until they attempt to logon to the network under their old domain ID. Therefore in the preferred embodiment of the present invention, the domain controller 18 for Domain #2 will respond to the initial logon request of such users and services, and (using the users' and services' old logon IDs) provide new account names for future use by the users and services. In some cases, the Domain #2 controller emulates the Domain #1 controller until the users and services on Domain #1 have reconfigured their network operating systems in order to establish membership in Domain #2.

Figure 6:
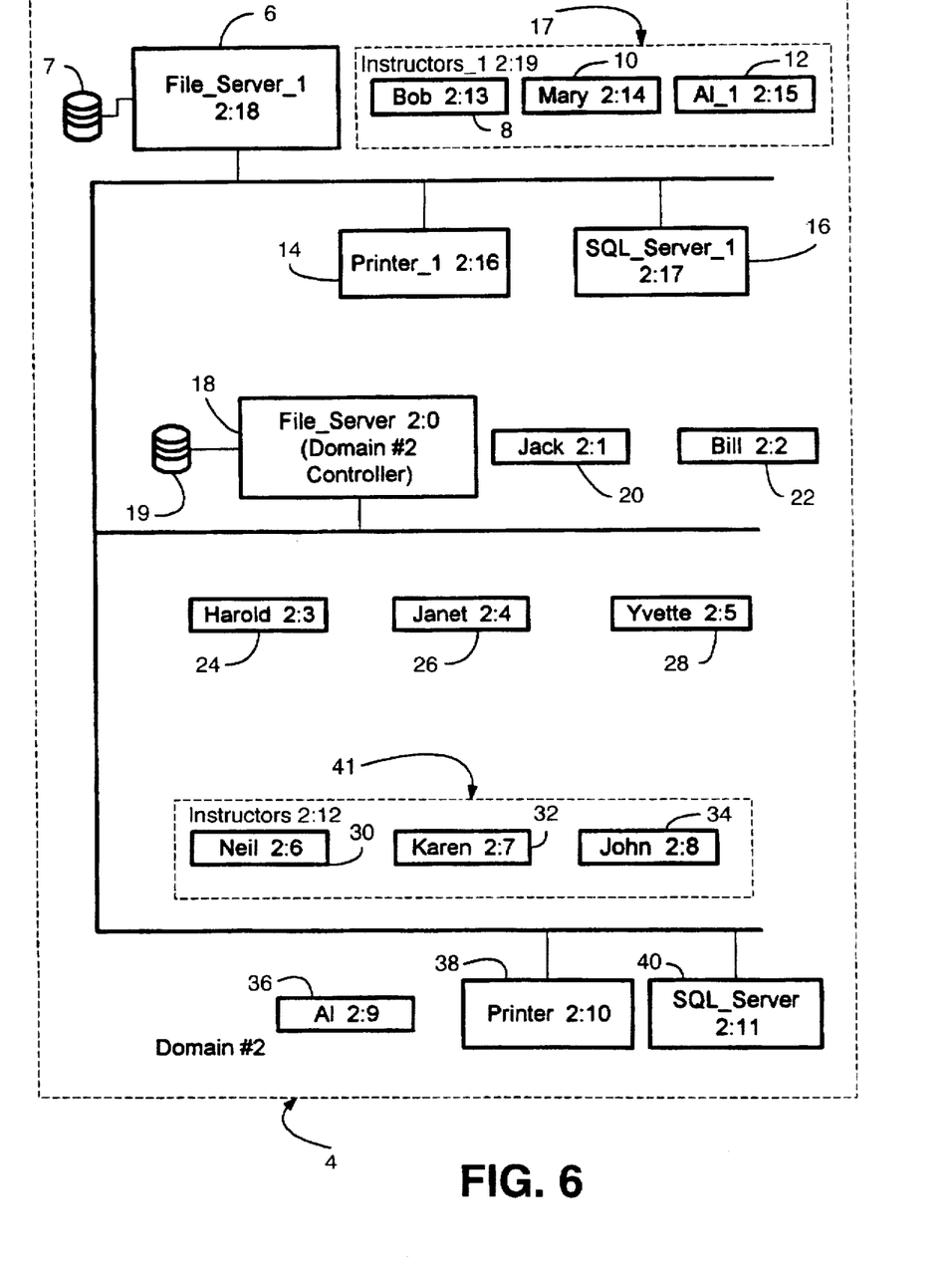
FIG. 6 illustratively depicts the network of FIG. 1 after the source domain (#1) has been merged into the target domain (#2)

Turning now to FIG. 6, the new Domain #2, resulting from the merger of Domain #1 into Domain #2 (depicted previously in FIG. 1) is schematically illustrated. All of the accounts associated previously with Domain #1 are now associated with Domain #2. However, the Domain #1 controller is maintained for a period of time until the users and servers on the merged domain have been programmed to recognize their new association with Domain #2 wherein administrative duties are handled by the primary domain controller 18. Furthermore, all of the duplicated account names have been replaced by unique account names in accordance with the account name conflict resolution database. It is also noted that the SIDs have been modified for all of the accounts previously associated with Domain #1. However, in accordance with the illustrative embodiment of the present invention, the Domain #1 SIDs are maintained for each of the accounts formerly associated with the source domain (Domain #1).

Figure 7:
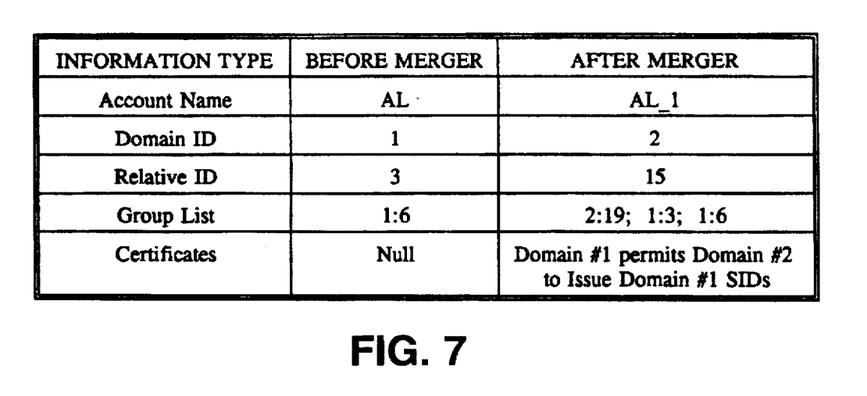
FIG. 7 is a table showing the transformation of the security context information associated with a user account as a result of a merger operation.

Turning briefly to the table depicted in FIG. 7, two sets of information are provided relating to the individual account for the User 12 before and after the account is merged from Domain #1 into Domain #2 in accordance with the present invention. It is first noted that the account name is changed from "AL" to "AL__1." The SID for the User 12 is converted from 1:3 to 2:15.

The Group SID assigned to the Group 17 (of which the User 12 is a member) in the Domain #1 was 1:6. However, the Group SID for the Group 17 was changed to 2:19 when the Group 17 was copied into Domain #2. In addition, the merging tool stores the SIDS 1:3 and 1:6, corresponding to former SIDs for the User 12 and the Group 17, within the Group List 56 for the User 12 account. Finally, in order to authenticate the SIDs issued in the context for the User 12, the Domain Controller 6 issues a certificate for Domain #1 to the Domain Controller 18.

Figure 8:
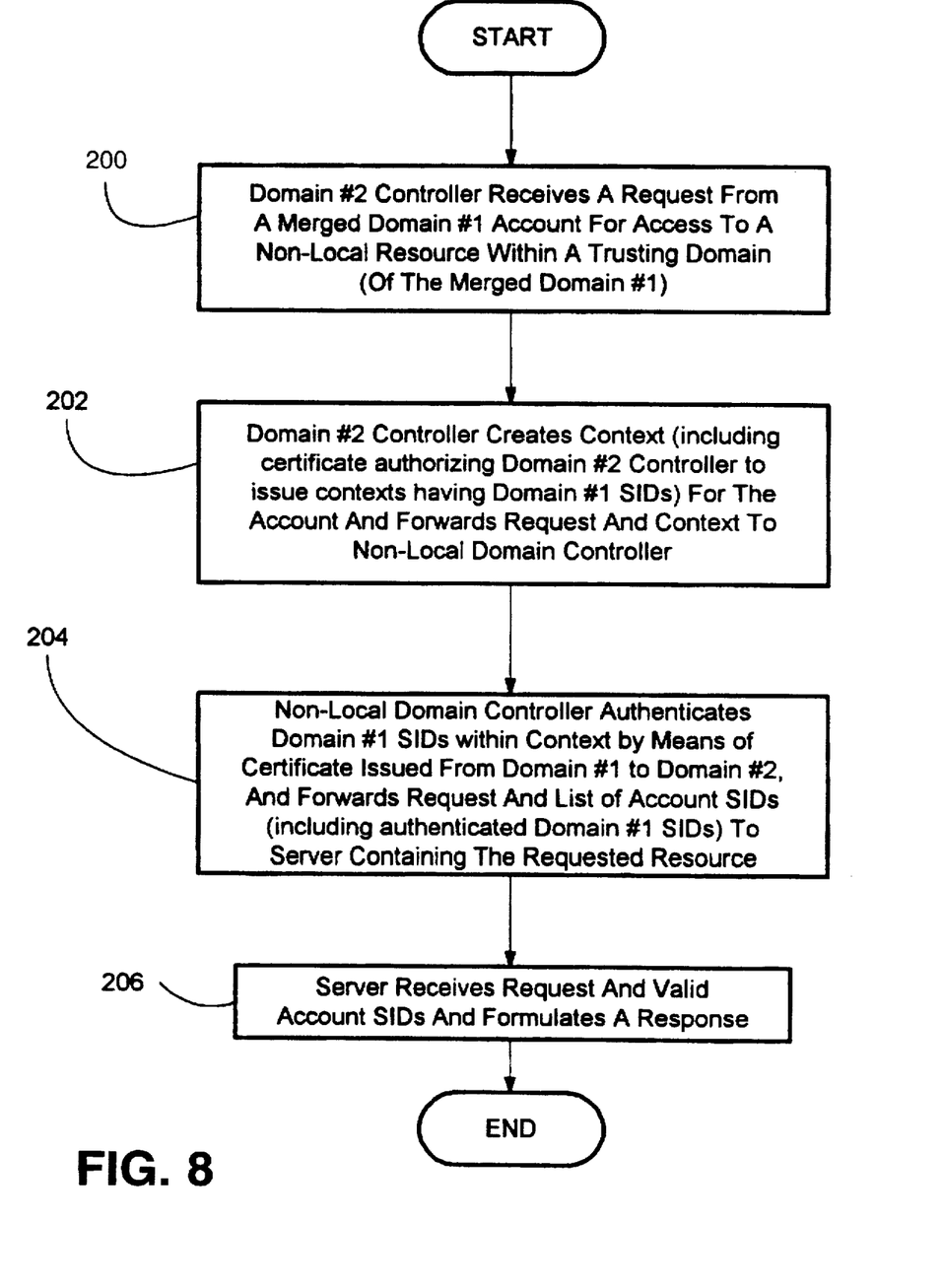
FIG. 8 is a flow chart illustrating the steps for authenticating a request via a certificate associated with a merged domain.

Having completed a description of the steps for merging domains in accordance with the present invention, the steps for processing a request to a protected network resource in a non-local domain from a user or service account transferred from Domain #1 to Domain #2 during the above described merger operation are summarized in FIG. 8. At step 200, the Domain #2 Controller 18 receives a request, from an individual account (such as User 8) merged from Domain #1 to Domain #2, for access to a non-local resource. The non-local resource is associated with a domain with which the Domain #1 had established a trusting relationship enabling non-local requests from Domain #1 to the non-local domain.

Next at step 202, the Domain #2 controller 18 retrieves the above described context information (see FIG. 2) from the database 19 and generates a context for the request from the User 8. The list of certificates in the generated context contains at least the certificate authorizing the Domain #2 Controller 18 to issue SIDs containing the domain ID for Domain #1. After generating the context for the non-local request, the Domain #2 Controller 18 forwards the generated context and the user request to a domain controller associated with the requested non-local resource.

Next at step 204, after receiving the context and the non-local request from the Domain #2 Controller 18, the domain controller associated with the requested non-local resource verifies the authority of the Domain #2 controller to issue a context containing Domain #1 SIDs by decrypting, by means of a public key issued by the Domain #1 controller to the non-local domain controller, the Domain #1 certificate included in the received context. After applying the public key and verifying that, indeed, the Domain #2 controller is authorized to issue contexts including Domain #1 SIDs, the domain controller associated with the requested non-local resource forwards the request and SIDs associated with at least the Domain #1 certificate (as well as any other authorized SIDs) to the server containing the requested non-local resource. Thus, if the certificate corresponding to the merger of Domain #1 into Domain #2 confirms the authority of the Domain #2 controller to issue Domain #1 SIDs, then the Domain #1 SIDs for the User 8 and Group 17 (with which the User 8 is associated) are forwarded to the server containing the requested non-local resource.

It is noted that a context may include SIDs from more than a single merged domain. A non-local controller, upon receiving a context including SIDs from multiple merged domains, may determine that the authority of the issuing domain controller (e.g., Domain #2 controller) to issue one or more SIDs within the context is not confirmed/supported by the presence of a validating certificate within the context. When the context includes other, confirmed SIDs (by virtue of other valid certificates in the context), it is contemplated that a variety of possible responses can be formulated by a domain controller. The receiving domain controller may issue a general failure to the issuing domain controller and not forward the request or SIDs to the appropriate server even when valid (certificate confirmed) SIDs are included in the request from another domain. Alternatively, the domain controller may forward to the server only the SIDs corresponding to confirming certificates contained within the received context and discard any SIDs for which a confirming certificate could not be identified.

Next, at step 206, the server applies the SIDs to the set of ACEs within the ACL for the requested non-local resource.

If the comparison of the SIDs to the ACEs indicates that the request from the User 8 is valid, then the server performs the requested operation on the resource and returns a response including, if appropriate, the results of the request. If the server determines that the request is invalid in view of the received SIDs, then the server returns a response to the request indicating that the requested operation is not permitted. Control then passes to the End.

An illustrative example of the present invention has been described. However, as will be evident to those skilled in the art in view of the preferred embodiment described in the drawings and the foregoing written description, the scope of the present invention should not be restricted to the disclosed preferred embodiment. Examples of modifications include the form and content of the security account information, network topologies, network operating systems, and the specific details and order of execution of the described steps for carrying out merging a source domain into a target domain. Rather, the invention should be measured by the scope and spirit of the invention as defined by the claims appended below and include such modifications to the disclosed embodiment of the invention that would be known to those skilled in the art.

What is claimed is:

1. A method for merging a source security domain having a plurality of source domain user accounts into a target security domain having a plurality of target domain user accounts in a network, wherein the set of source domain user accounts are provided access to protected source domain network resources based upon source user account identification information associated with each of the source domain user accounts and the set of target domain user accounts are provided access to protected target domain network resources based upon target user account identification information associated with each of the target domain user accounts, the method comprising the steps of:

creating a set of new target domain user accounts within the target security domain corresponding to the set of source domain accounts; and transferring information for the set of source domain user accounts from a source domain security database into the set of new target domain user accounts in a target domain security database, including storing source user account identification information associated with at least one merged source domain user account within a corresponding new target domain user account, wherein the corresponding new target domain user account is provided access to protected source domain network resources based upon at least a subset of the source user account identification information stored within the corresponding new target domain account, wherein the source user account identification information includes a source domain account user name and a source domain user account identification.

2. The method of claim 1, wherein the source user account identification information further includes a source domain group account identification corresponding to a source domain group account within which the merged source domain user account is a member.

3. The method of claim 1, wherein the source user account identification information includes a non-source domain account identification stored in the source domain security database and associated with a domain previously merged into the source domain.

4. The method of claim 1, further comprising the step of:

issuing, by a source domain controller, a certificate authorizing a target domain controller to issue source domain security identifications for a source domain user account merged from the source domain to the target domain.

5. The method of claim 4, wherein public key encryption is incorporated into the procedures for issuing and interpreting the data within the certificate, the method further comprising the step of:

encrypting, prior to the issuing step, an authorization within the certificate by means of a private key.

6. The method of claim 1, further comprising the steps of:

identifying a source domain user account name matching a target domain user account name; and first modifying a user account name for at least one of the matching user account names in order to maintain a set of distinct user account names associated with the source domain and target domain user accounts.

7. The method of claim 6, wherein the user account name modified during the first modifying step corresponds to a constituent account of a group account including a list of constituent account names, further comprising the step of:

second modifying a user account name, in the list of constituent account names, in accordance with a new name assigned to the user account name modified during the first modifying step.

8. The method of claim 1 further comprising the step of:

assigning target domain user account identifications to each user account within the set of new target domain accounts.

9. The method of claim 8, wherein the source security domain includes a group account, and the group account includes a list of identifications corresponding to constituent accounts of the group account, further comprising the step of:

storing target domain user account identifications, within the list of identifications, corresponding to new target domain user account identifications assigned to the constituent accounts during the assigning step.

10. The method of claim 1, wherein the source domain user account identification includes a domain identification assigned to all user accounts within the source domain, and a relative identification distinguishing each source domain user account from other source domain user accounts.

11. A method for servicing, by a protected network resource associated with a first domain having a plurality of first domain user accounts, a request by an individual entity having a user account within a second domain having a plurality of second domain user accounts, the method comprising the steps of:

receiving, by the protected network resource, the request from the individual entity associated with the second domain;

identifying a security identification, corresponding to a third domain, within the request facilitating access by the individual entity to the protected network resource in order to fulfill the request; and verifying, by reading a certificate accompanying the request, the authenticity of the security identification, and in response processing, by the protected network resource, the request.

12. The method of claim 11 wherein the verifying step comprises decrypting, by means of a public key, a private key encrypted certificate.

13. A method for transferring a first user account from a source domain having a plurality of source domain user accounts into a target domain having a plurality of target domain user accounts in a network, wherein the first user account is provided access to protected network resources based upon a source domain security identification assigned to the first user account and stored in an account security database serving the first user account, the method comprising the steps of:

designating a user account name for the first user account distinct from the set of user account names associated with target domain accounts;

replacing the source domain security identification in the account security data structure for the first user account, by a target domain security identification associated with the target domain; and adding the first security identification to a field within the account security data structure designated for listing security identifications previously assigned to the first user account.

14. A method for merging a source domain having a plurality of source domain user accounts into a target domain having a plurality of target domain user accounts in a network, wherein user accounts associated with the source domain are provided access to protected network resources based upon a source domain security identification assigned to each of the source domain user accounts and stored in an account security data structure, the method comprising the steps of:

generating a set of unique names corresponding to the user accounts associated with the source domain and the target domain; and creating a set of new account security data structures in the target domain security database for user accounts transferred from the source domain to the target domain, the creating step comprising the sub-steps of:
      assigning within each of the set of new account security data structures a target domain security identification associated with the target domain; and
      adding, for each of the set of new account security data structures, the source domain security identification to a field designated for listing security identifications previously assigned to the account.

15. A method for merging a set of source domain accounts into a target domain in a network, wherein the set of source domain accounts are provided access to protected source domain network resources based upon identification information associated with each of the accounts, the method comprising the steps of:

creating a set of new domain accounts within the target domain corresponding to the set of source domain accounts;

identifying a source domain account name matching a target domain account name;

first modifying an account name for at least one of the matching account names in order to maintain a set of distinct account names associated with the source domain and target domain accounts, wherein the account name modified during the first modifying step corresponds to a constituent account of a group account including a list of constituent account names;

second modifying an account name, in the list of constituent account names, in accordance with a new name assigned to the account name modified during the first modifying step; and transferring information for the set of source domain accounts from a source domain security database into the set of new domain accounts in a target domain security database, the transferring information step comprising performing for each merged source domain account within the set of source domain accounts the steps of:
      storing an account name corresponding to the merged source domain account; and
      storing a source domain account identification associated with the merged source domain account.

16. A method for merging a set of source domain accounts into a target domain in a network, wherein the set of source domain accounts are provided access to protected source domain network resources based upon identification information associated with each of the accounts, wherein the set of source domain accounts includes a group account, and the group account includes a list of identifications corresponding to constituent accounts of the group account, the method comprising the steps of:

creating a set of new domain accounts within the target domain corresponding to the set of source domain accounts;

assigning target domain account identifications to each account within the set of new domain accounts;

storing target domain account identifications, within the list of identifications, corresponding to new target domain account identifications assigned to the constituent accounts during the assigning step; and transferring information for the set of source domain accounts from a source domain security database into the set of new domain accounts in a target domain security database, the transferring information step comprising performing for each merged source domain account within the set of source domain accounts the steps of:
      storing an account name corresponding to the merged source domain account; and
      storing a source domain account identification associated with the merged source domain account.

* * * * *